(12) United States Patent
Petersen

(10) Patent No.: US 9,300,776 B2
(45) Date of Patent: Mar. 29, 2016

(54) SYSTEM AND METHOD FOR DETECTING POTENTIALLY DAMAGING MOTION

(75) Inventor: Heidi Marie Petersen, Oakland, CA (US)

(73) Assignee: Location Labs, Inc., Emeryville, CA (US)

( * ) Notice: Subject to any disclaimer, the term of this patent is extended or adjusted under 35 U.S.C. 154(b) by 156 days.

(21) Appl. No.: 13/304,993

(22) Filed: Nov. 28, 2011

(65) Prior Publication Data

US 2013/0138715 A1    May 30, 2013

(51) Int. Cl.
*G06F 15/16* (2006.01)
*H04M 1/24* (2006.01)

(52) U.S. Cl.
CPC ............ *H04M 1/24* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 6,940,407 | B2* | 9/2005 | Miranda-Knapp | G08B 13/1418 340/539.13 |
| 7,059,182 | B1* | 6/2006 | Ragner | H05K 5/0086 73/200 |
| 7,541,551 | B2* | 6/2009 | Wehrenberg | G11B 19/04 200/61.45 R |
| 8,255,006 | B1* | 8/2012 | Chavez et al. | 455/567 |
| 2010/0188243 | A1* | 7/2010 | Tysowski et al. | 340/669 |
| 2011/0279263 | A1* | 11/2011 | Rodkey et al. | 340/539.13 |
| 2013/0073095 | A1* | 3/2013 | King et al. | 700/279 |

* cited by examiner

*Primary Examiner* — Thomas Dailey
(74) *Attorney, Agent, or Firm* — Dovas Law P.C.

(57) ABSTRACT

Disclosed is a network for determining when a device undergoes potentially damaging motion. The device runs application software that causes a device processor to interrogate at least an accelerometer to determine if a motion threshold that signals potentially damaging motion may have occurred is exceeded. If the threshold is exceeded the device sends motion information to a central server for further processing. The central server processes the motion information to determine if the device underwent potentially damaging motion. If it has, the central server sends an appropriate notification that the device underwent potentially damaging motion.

28 Claims, 4 Drawing Sheets

SYSTEM AND METHOD FOR DETECTING POTENTIALLY DAMAGING MOTION

FIELD OF INVENTION

The principles of the present invention relate to detecting potentially damaging motions. More specifically, those principles enable better design, selection, and use of devices by implementing a network formed by application software that sends sensor information to a central server for determination of potentially damaging motion.

BACKGROUND

Technology users have tended to move away from things that sit in one place, for example cabinet style televisions, toward things that move, for example, cell phones. In fact, laptop computers, portable phones, tablet computers, handheld digital recorders, digital cameras, music players, and personal data devices owe much of their popularity to portability. This portability evolution only emphasizes the unmistakable fact that moving things are highly subject to damage. Examples are plentiful. A dropped cell phone may either no longer work or it may suffer serious visual damage to its case or antenna. A laptop computer placed down too hard on a table may result in damage to its hard drive. A handheld digital recorder can accidently be run into a door frame.

One reason that so many devices can be made portable is the current state of semiconductor technology. High speed and highly configurable microprocessors and microcontrollers are readily available at very reasonable cost and in very small packages. High density, usually programmable, support devices such as solid state memory and "glue" chips, and even more dedicated special purpose devices are also readily available.

Many portable devices are dynamically programmable, that is, they can be programmed not only at the time of manufacturer but later using user-installed application software. User-installed application software, referred to hereinafter as apps, are an extremely flexible and popular methods of installing software onto a device to enable a user to personalize his product to his own needs.

While portable devices can and do break, they do not necessarily have to break as often or as easily as they do. High impact plastic cases, reinforcing padding, smooth surfaces, spring loaded components, and many other design options are readily available. However, those design options are not free and to be most effective they need to be applied intelligently. In addition, while commercial competition often may reward higher reliability it can also severely punish higher costs.

From the foregoing it can be seen that the question of whether to and how to implement design options to improve reliability is not trivial. Implementing protective designs options when not needed or over-applying those options that are needed may result in reduced sales. Not applying protective design options, applying them insufficiently or incorrectly may also lead to reduced sales.

Unfortunately, knowing whether to and how to implement a protective design option is remarkably difficult. The standard approach is to run a series of reliability tests, such as impact tests, drop tests, vibration tests, heat and cold stress tests, moisture tests, and others on a number of test products. Results are compiled and decisions are then made based on those results. This approach is useful, but it is certainly not optional. For example, it is difficult or impossible to obtain real-world use information.

Another approach is to incorporate sensors, such as vibration sensors, accelerometers, gyroscopes, stress sensors and the like into products when running tests. This approach has the decided advantage of providing actual engineering information to product designers. It still has the very serious drawback that such tests are still laboratory tests that may or may not have applicability to real world use.

Furthermore, even if design data is not at issue, in practice some devices are simply better suited for some users in some applications. Some users may simply wish to be warned when they are doing something potentially damaging to a device so that they can take better care in the future. Parents, employers, or other providers of products may wish to find out just how hard users are on a device. Such information could be very useful in actually selecting the products for particular users or applications. Some applications, such as maritime use, may be more potentially damaging than other applications, such as aircraft use. Knowledge of how hard products are handled can be used to select devices or protective packaging such as reinforced plastic cases or padded product carriers.

Unfortunately, in the prior art there was no easy way for designers, device providers, or device users to obtain pertinent real-world information on when potentially damaging motion occurs to a device or how hard a device is being physically used. Therefore, a way of obtaining information about when potentially damaging motion occurs and/or how hard a device is used would be useful. Beneficially, such information could be compiled from each user and from a multitude of users to provide real world information.

SUMMARY

The principles of the present invention provide for a method of enabling designers, device providers, and/or device users to obtain pertinent real-world information regarding potentially damaging motion to a device and on just how hard a device is being used. Those principles enable compilation of potentially damaging motion data from a multitude of users in a manner that provides real world information about product usage. That information can be provided to the user of a product, its owner, interested product designers, or to other interested parties either in real time or as compiled data.

The principles of the present invention are beneficially implemented by processors that run software comprised of app software and central server software. The app software gathers information from on-board sensors, and processes that gathered information to determine when a device's movement exceeds a threshold that signals that potentially damaging motion may have occurred. If the threshold is exceeded the app software formulates an appropriate response request (if any) from the central server, and causes that processed information and response request, if any, to be transmitted to the central server. The central server software receives the information sent by the app software, filters that information in accord with programmed instructions, parses and stores the filtered information in a database, and decodes the response request (if any). The central server analyzes the information it received to determine if potentially damaging motion occurred. The central server then formulates an appropriate response and causes that response to be sent to an interested user (usually back to the app software). The app software then takes appropriate action, such as notifying a user that potentially damaging movement has occurred.

The principles of the present invention enable a computer-implemented monitoring and reporting method in a portable device motion detection apparatus. When portable device motion information is detected by the motion detection apparatus a determination is made as to whether the motion information exceeds a predetermined threshold. If the predetermined threshold is exceeded an indication is provided to a user.

Exceeding the threshold beneficially can cause a prediction based on the detected motion information that a portion of the mobile device is subject to increased structural loading. The user may be informed about the increased structural loading, about structural protection required to prevent damage to the mobile device, about a recommended protective case, or about a network location having information about a commercial offering of suitable structural protection.

Alternatively, exceeding the threshold may beneficially cause the portable device to determine an application that was active when the predetermined threshold was exceeded. The user could then be provided an indication of that application.

As another alternative, exceeding the threshold beneficially may cause the orientation of the portable device to be determined at the time the predetermined threshold was exceeded. That orientation could then be provided directly to the user, or that orientation and detected motion information could be used to predict increased structural loading on the portable device. In that case the user could then be informed about that increased structural loading.

A server system may be in communication with the portable device over a network. Motion information of the portable device could then be received by the server system. The server system could then determine if the motion information exceeds the predetermined threshold. If it does, the server system could inform the user that motion information exceeded the predetermined threshold. Preferably that would be done by transmitting information from the server system to the user via the portable device.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

The presently disclosed subject matter will now be described more fully hereinafter with reference to the accompanying drawings in which various embodiments are shown. However, it should be understood that this invention may take many different forms and thus the present invention should not be construed as being limited to the embodiments set forth herein. In the figures like numbers refer to like elements. Furthermore, the terms "a" and "an" herein do not denote a limitation of quantity, but rather denote the presence of at least one of the referenced items.

Figure 1:
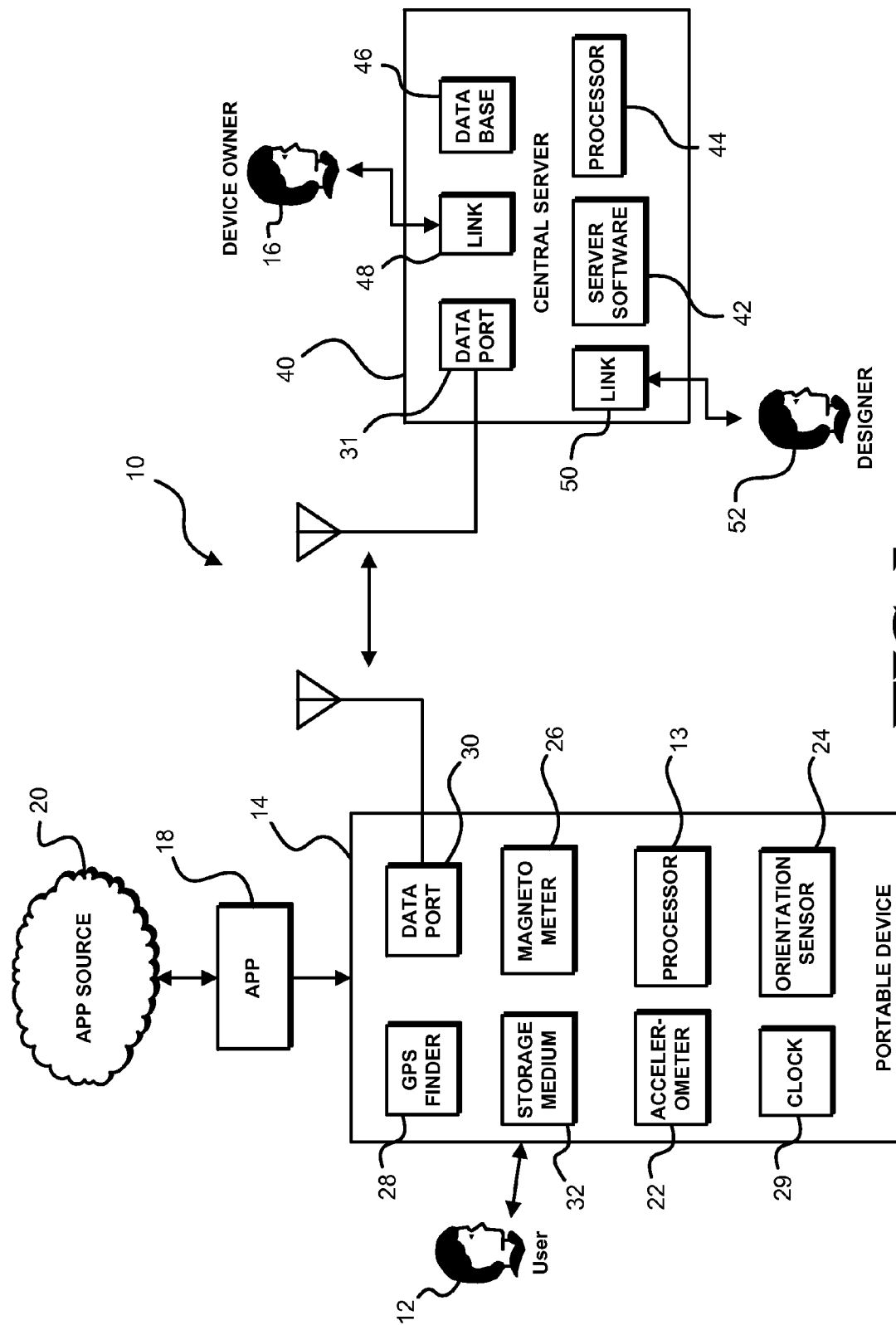
FIG. 1 shows a network that supports the principles of the present invention.

FIG. 1 illustrates a network 10 for implementing the principles of the present invention. As illustrated, the network 10 includes a user 12 that carries a processor 13 based portable device 14. The user 12, a device owner 16, or another interested party such as the device 14 manufacturer causes software app 18 to be downloaded from an app source 20. Examples of the foregoing are a child (user 12) who is given a cell phone (device 14) by a parent (device owner 16) and who downloads app 18 from a phone store (app source 20). Of course, that is merely an example and there are numerous alternatives and variations to the foregoing.

The device 14 includes a number of "built in" sensors and data sources that are accessible by the processor 13. Typically these will include an accelerometer 22, an orientation sensor 24 that determines the orientation (pitch, yaw, roll) of the device 14, a magnetometer 26, a GPS finder 28, a clock 29, a data port 30, and a storage medium 32. Despite the seemingly overwhelming complexity of the device 14 such devices having some or all of the foregoing sensors are available at reasonable cost almost anywhere in the U.S. and are sold by the tens of millions worldwide.

Most importantly, the data port 30 provides a communication link between the device 14 and a central server 40 (which is a system server). Preferably the data port 30 link is something like the Android™ system or another such communication network. However, while such links are preferable other communication links are certainly possible. For example, a Bluetooth™ link to an internet port or any other wireless link that establishes communications between the device 14 and the central server 40 is appropriate.

While bi-directional communication between the device 14 and the central server 40 is extremely beneficial, a one way link from the device 14 to the central server 40 may be appropriate in some applications.

The central server 40 operates in accord with its own server software 42. The central server 40 further includes a processor 44 for processing information in accord with the server software 42, a database 46 for storing data, and a variety of possible communications links, shown as a link 48 for sending information to the device owner 16 (if any), a link 50 for sending data to an interested party such as a designer 52, and a data port 31 to establish a link compatible with the data port 30 to enable communications with the device 14.

It should be clearly understood that the network 10 is highly flexible and configurable. In many (most) cases there will not be a device owner 16 because the user 12 will own the device 14. As the only interested party may be the user 12, the designer 52 and the device owner 16 may not be present. Therefore, in some networks the link 48 and the link 50 will not be present (or if present, not used). The minimal topology of the present invention includes the device 14 with its sensors, the app 18, the central server 40, and a link via data port 31 and data port 30.

The purpose of the network 10 is to detect motion that might be harmful to the device 14. As potentially damaging motion primarily results from either acceleration or snap (being the rate of change of acceleration) the accelerometer 22 is a key component in fulfilling the purpose of the network 10.

Figure 2A:
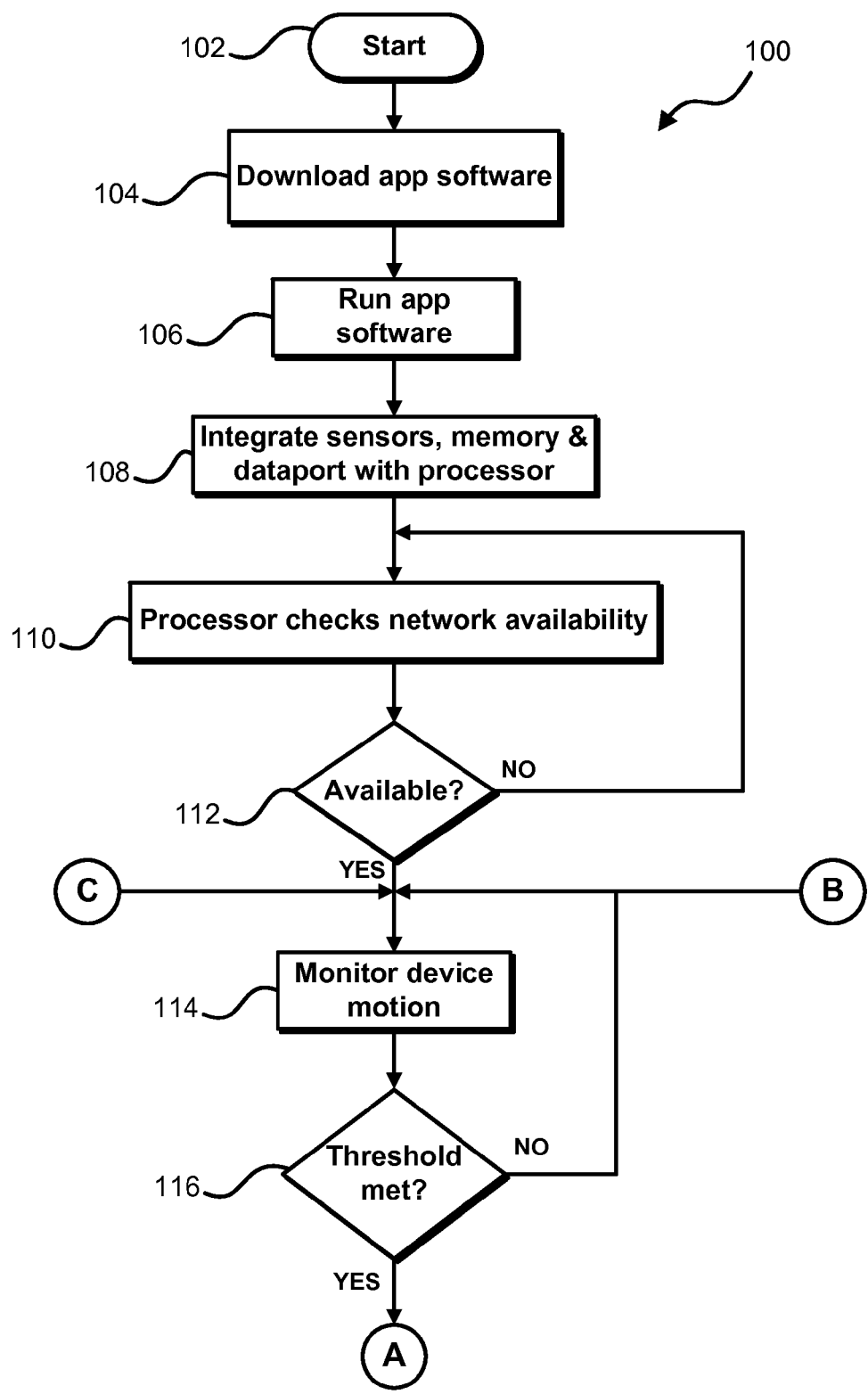
FIG. 2A illustrates a flow diagram of part of an operation 100 of the device 14 as shown in FIG. 1.
Figure 2B:
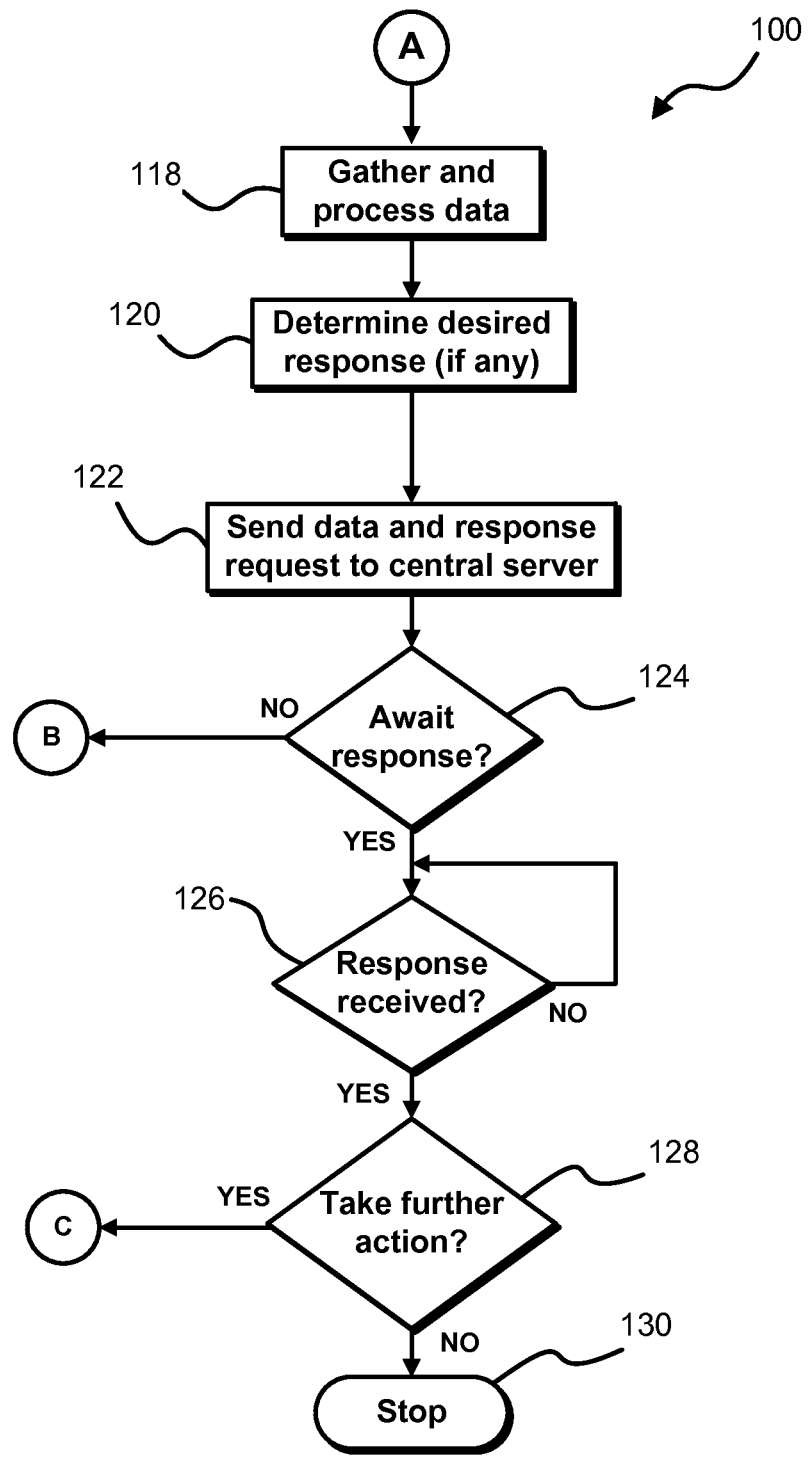
FIG. 2B illustrates a flow diagram of another part of the operation 100 of the device 14 as shown in FIG. 1.

FIGS. 2A and 2B present flow charts showing the operation 100 of the app 18 controlled device 14. The operation 100 starts (step 102) and proceeds with the user 12 downloading the app 18 from a remote app source 20 (step 104). The user 12 then runs the app 18 software on the device 14 (step 106).

The app 18 causes the processor 13 to integrate with the "built in" sensors, memory, and data port of the device 14 (step 108). This integration specifically includes integrating the accelerometer 22, the data port 30, the storage medium 32, and possibly, depending on the motion that is being monitored, the orientation sensor 24, magnetometer 26, GPS finder 28, clock 29 and any other sensor within the device 14.

The app 18 causes the processor 13 to check the availability of the communication network (step 110). This will usually be accomplished using the data port 30 to check for a signal, or possibly establishing actual access to the central server 40. The app 18 can be configured to operate in several ways if the communication network is not functioning. For example, the app 18 may simply loop (step 112), as shown in FIG. 2, or it may operate by storing information in the storage medium 32 for subsequent transmission to the central server 40. It should be understood that checking for network availability can be performed as a later step such as after potentially damaging motion has been detected.

The app 18 then monitors the motion of the device 14 (step 114). This is performed by causing the processor 13 to monitor the output of the accelerometer 22. The processor 13 detects if a threshold criterion that signals that potentially damaging motion may have occurred has been met (step 116). If the threshold criterion has not been met operation returns to step 114 for further monitoring of the device's motion. However, if the threshold criterion was met the processor 13 gathers and processes data in accord with software code contained in the app 18 (step 118).

As noted, step 116 determines whether certain threshold criterion that signals that potentially damaging motion has been met. To understand how the threshold criterion is determined consider an app 18 establishing a ceiling acceleration threshold and a floor acceleration threshold. When performing step 116 if neither threshold is exceeded the processor 13 simply polls the accelerometer 22, possibly stores values for later use (depending on the app 18 code), continues to handle other chores such as running other applications, and returns per step 116 to step 114 to continue monitoring device motion.

However, if the device 14 and its motion detection sensor apparatus detect motion information that exceeds a predetermined threshold various actions can be taken, specifically including indicating to the user 12 that the motion information exceeded the predetermined threshold.

It should be understood that the thresholds and processor 13 actions are determined in accord with the reason the motion of device 14 is being monitored. Consider that some devices are simply more rugged than others (for example a device with solid state memory will usually be far more rugged than one that depends on rotating disc memory), and thus the thresholds that signal the possibility of potentially damaging motion will be different. Furthermore, some motions may be more interesting than other motions. For example, a designer 52 attempting to reinforce a case may be interested in impacts or other structural loading only along certain axes of the device 14, or only after a device 14 undergoes free-fall such as when dropped. Thus processor 13 actions and thresholds differ from application to application.

If the accelerometer 22 undergoes motion that exceeds threshold criterion that signals the possibility of potentially damaging motion, the processor 13 takes programmed action per step 118. Merely exceeding an acceleration threshold in some cases may be enough to consider that potentially damaging motion might have occurred. For example, if the app 18 performs car crash detection, exceeding a simple threshold might be sufficient to establish that potentially damaging motion may have occurred.

As another example, merely exceeding the threshold may cause the device 14 to inform the user 12 about an application that was co-running with the app 18. Alternatively, merely exceeding the threshold may cause the device 14 to query the orientation sensor 24 and to inform the user 12 of the orientation of the device 14 when the threshold was exceeded. Additional or other information might also be provided, such as providing an indication of the increased structural load to a portion of the device when the threshold was exceeded.

However, in many cases simply exceeding an acceleration threshold may only be enough to cause the processor 13 to look into the matter more carefully. For example, if the potentially damaging motion of interest is an impact that causes structural loading only on a portion of the device 14, exceeding the threshold of potentially damaging will cause the processor 13 to examine the output of the orientation sensor 24. If the output of the orientation sensor 24 is such that the impact is in the portion of interest the device 14 may provide an indication of the increased structural loading to the user 12. Alternatively, the device user 12 might be provided with information regarding structural protection required to prevent damage, such as a particular protective case. As another example, the user 12 might be provided with a link to a network location corresponding to a commercial offering of structural protection.

As another example, consider a designer 52 who is interested in evaluating potentially damaging motion to the device 14, but only after the device 14 has been dropped, and then only if the device 14 is rotating. This allows the designer 52 to eliminate monitoring the case where a user 12 merely drops the device 14 a relatively short distance onto a table, but will allow monitoring potentially damaging motion where the device 14 falls off the table and rotates.

To do so the app 18 establishes an accelerometer 22 ceiling threshold somewhere near the acceleration of gravity (9.8 m/s$^2$); say above 6.5 m/s$^2$. Until that ceiling threshold is exceeded the processor 13 determines that the threshold criterion for potentially damaging motion has not occurred. But, if the 6.5 m/s$^2$ ceiling threshold was exceeded the processor 13 stores accelerometer 22 readings and begins looking for a sharp decrease in acceleration as denoted by an accelerometer 22 reading below a floor threshold, say 3.5 m/s$^2$. Additionally, since the only motion of interest to the designer 52 is if the device 14 is rotating, the processor 13 interrogates the orientation sensor 24 to obtain and store orientation readings. The processor 13 further interrogates the clock 29 to obtain and store time readings.

If the motion meets the floor threshold (3.5 m/s$^2$) within a time threshold period, say 0.2 to 2 seconds, the processor 13 interrogates the orientation sensor 24 readings. If the device 14 orientation has changed significantly (say 20 degrees/sec along any axis) the processor 13 determines that the device 14 has met the threshold criterion of the potentially damaging motion of interest, falling of a table. In that case operation advances from step 116 to step 118 where pertinent data is gathered and processed. However, if the floor threshold (3.5 m/s$^2$) does not occur within the time threshold period, or if the orientation of the device 14 has not changed sufficiently when the floor threshold (3.5 m/s$^2$) is met, the processor 13 determines that the device 14 has not undergone potentially damaging motion of interest (has not fallen off a table). The operation then reverts from step 116 to step 114 and the processor 13 clears the memory it was using.

If the threshold criterion for potentially damaging motion is met in step 116, the app 18 causes the processor 13 to gather and process data (step 118). The data that is gathered and how it is processed depends on the particular reason potentially damaging motion is being monitored. For example, if the motion is being monitored for crash detection, after a crash event has occurred the app 18 can cause the processor 13 to interrogate and obtain data from the GPS finder 28 as to the location of the crash, the clock 29 to determine when the crash occurred, and the accelerometer 22 to determine the severity of the crash. As another example, if potentially damaging motion is being monitored to determine if the device 14 has fallen off a table, the app 18 might cause the processor 13 to interrogate and obtain data from the orientation sensor 24 to determine how far the device rotated and the axis of impact, the clock 29 to enable a determination of how far the fall was, and the accelerometer 22 to determine how severe the impact was. In almost all cases the obtained data will be processed to be formatted in the proper form for transmission from the data port 30 to the central server 40. Thus the storage medium 32 will be accessed several times.

After step 118, the app 18 will determine a desired response, if any, from the central server 40 (step 120). For example, if the app 18 software code is such that the device 14 should inform the user 12 that potentially damaging motion has been experienced; the app 18 will request such notification. Note that the central server 40 determines that potentially damaging motion has occurred while the device 14 is being used as a data source. As another example, if potentially damaging motion is being monitored for crash detection the app 18 software might request a response that emergency services be notified. In other cases, such as if the potentially damaging motion is being used to determine if the device 14 has fallen from a table, no response request is needed so none is sent.

After step 120 the processed data and response request (if any) is sent from the data port 30 to the central server 40 (step 122). The app 18 then determines if the device 14 should wait a response from the central server 40 (step 124). If the device 14 should not wait for a response, the app 18 software causes the operation 100 to return to step 114 for further processing. But, if the device 14 should wait for a response, the app 18 enters a wait loop until a response is received (step 126).

Once a response has been received (or if none is required) the app 18 software causes the processor 13 to decide whether to take further action (step 128). If further action should be taken the app 18 software causes the operation 100 to return to step 114 for further processing. If not, the operation 100 stops (step 130).

The foregoing has described the operation of the device 14. Of course, many variations or additional steps are possible. But in all cases the app 18 causes the device 14 to use its sensors to obtain data useful for determining if potentially damaging motion has occurred and for sending appropriate information to the central server 40. It is the central server 40 that has the most computational power to process data and compile information it receives to determine if potentially damaging motion has occurred. The central server 40 may be in communication with numerous devices running numerous copies and forms of application software. That is, the central server 40 has sufficient resources and processing capability to determine one type of potentially damaging motion from one app, says crash detection, and another type of potentially damaging motion from another app, say falling from a table.

Using a central server 40 is highly beneficial as only one program needs to be maintained and because sufficient processor power is readily available. Instead of requiring hundreds or thousands of new downloads to the devices 14 every time a change is made to the programming that determines how potentially damaging motion is determined, reported, and how data is compiled, only the central server 40 software needs to be changed. In addition, the central server 40 can gather and process data for customized needs of interested parties 52.

Figure 3:
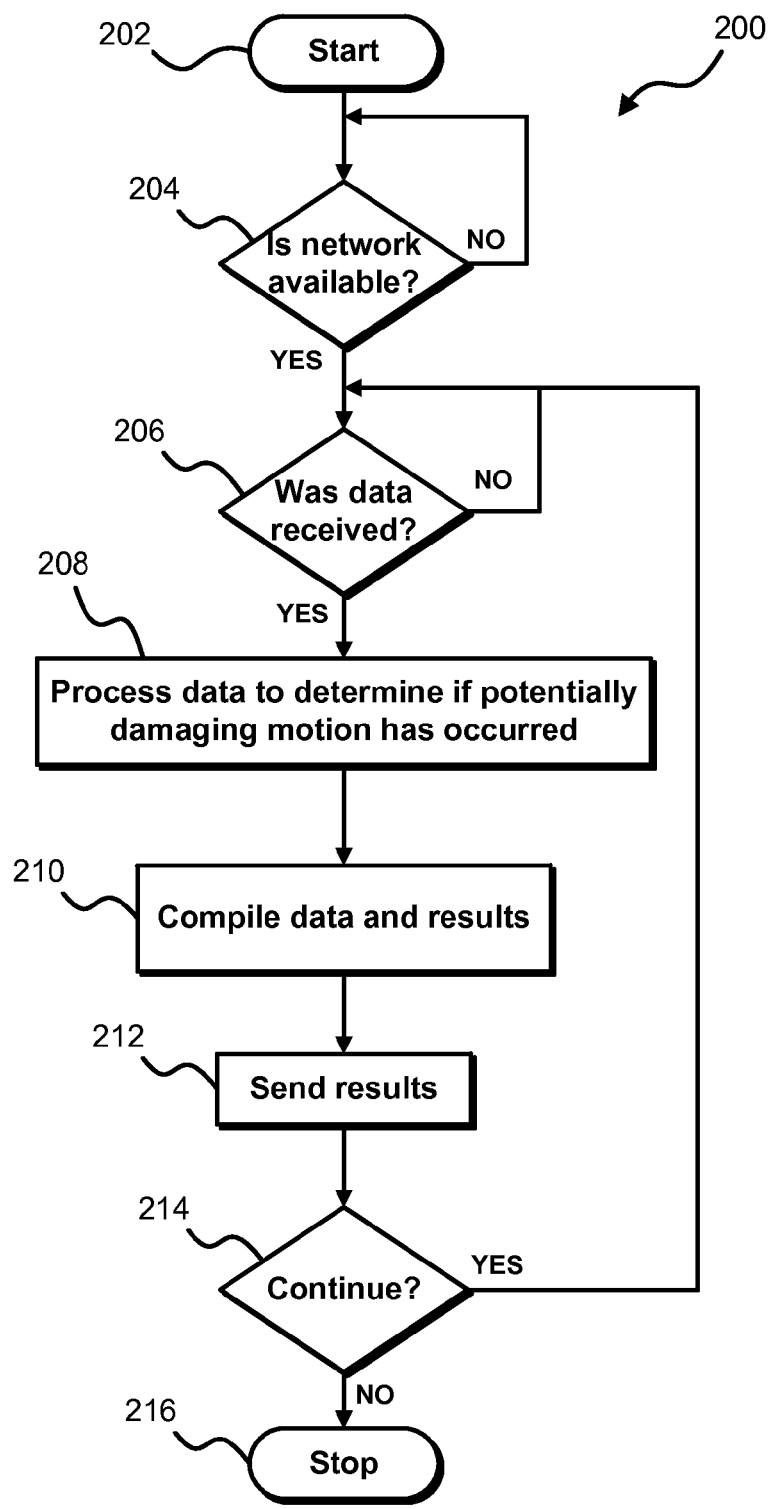
FIG. 3 is a flow diagram that illustrates the operation of the central server as shown in FIG. 1.

FIG. 3 illustrates the operation 200 of the central server 40 (or system server). The operation 200 starts (step 202) and proceeds with the central server 40 determining if network communications are available, step 204. If not, the central server 40 enters a loop until network communications are available. Once network communications are available the operation 200 proceeds to determine if any data from a device 14 has been received (step 206). If not, the central server 40 enters a loop until such data is received.

Once data has been received the central server 40 processes the received data and the response request, if any, to determine if potentially damaging motion has occurred (step 208). If the device 14 requested notification that the potentially damaging motion threshold was exceeded the central server 40 will send a message to the device 14 that such motion occurred.

As with the app 18, what potentially damaging motion is depends on why such motion is being examined. Crash detection, free fall, dropping, impacts along particular axis, real world engineering data gathering, studies on how rough equipment is being handled, proper device selection based on handling, and many other potential reasons exist for determining when potentially damaging motion has occurred. Each use necessitates its own processing. Furthermore, one central server 40 might handle all of the foregoing using input from numerous devices 14. Subsequent processing of the inputs depending on the results to be obtained can then be performed. Thus the central server 40 must have sufficient processing capability to process the data it receives to fulfill its design mission.

After processing, the central server 40 compiles the data and its processing results for either immediate or future use (step 210). This will require the processor 44 to access the database 46. While performing certain types of potentially damaging motion, for example real world engineering analysis, data gathering from many devices 14 will be processed and the results stored. This enables a designer 52 to obtain results compiled from information from many devices 14. In any event, the central server 40 will contain valuable information suitable for use in many different ways.

Once the data and results have been compiled (step 210), the result or results are sent to an interested party (step 212). As previously noted there may be many different results and many different parties interested in potentially damaging motion. For example, a device 14 may have sent a response request that the central server 40 will attempt to fulfill. If a device 14 sends a response request that it be notified when a potentially damaging motion has occurred, the central server 40 will parse that request, determine whether potentially damaging motion has occurred, and, if such motion has occurred, sends the result to the device 14.

As another example, if the central server 40 is programmed to inform the device owner 16 that potentially damaging motion has occurred, the central server 40 will send the device owner 16 notice that potentially damaging motion has occurred when such motion is determined.

As yet another example, the designer 52 may wish to be kept informed of ongoing results of an Engineering analysis regarding potentially damaging motion. In that case, when potentially damaging motion is determined the central server 40 will retrieve compiled data in a format suitable for the designer 52 and then send the designer 52 the result.

The central server 40 can process data to obtain a wide range of information related to potentially damaging motion, such as frequency, direction, aggressiveness, and rapidity. That information can then be further refined for predicting likely sources and types of damage. Those predictions can be organized, grouped and distributed by user, time, device type, device form factor, manufacturer, or type of action. Information pertinent to the individual device can be sent to a client.

Such information will be useful for modifying the thresholds, the data that is collected, and possible alerts.

After the result has been sent a decision is made as to whether the central server 40 should continue operating, step 214. Since the answer is almost always yes, the operation 200 will usually return operation 200 to step 206 to await additional data. If not, such as when the server software 42 is being upgraded, the operation 200 will stop, step 216.

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A network for detecting potentially damaging motion, comprising:
   a device having a device processor operating in accord with application software, a device data port, and an accelerometer operatively connected to the device processor;
   a central server having a server data port and a server processor operating in accord with server software; and
   a data link from the device to the central server;
   wherein the application software causes the device processor to obtain accelerometer motion information from the accelerometer;
   wherein the device processor determines if the accelerometer motion information exceeds a threshold programmed by the application software, the threshold for determining whether potentially damaging motion may have occurred;
   wherein the device processes and sends accelerometer motion information from the device data port to the server data port over the data link when the accelerometer motion information exceeds the programmed threshold; and
   wherein the central server processes the accelerometer motion information;
   wherein it is determined in accord with application software that at least one application is active and co-running with the application software at an instance when the accelerometer motion information exceeds the predetermined threshold; and
   wherein an indication is provided to the user of the at least one application which was active and co-running with the application software at the instance when the accelerometer motion information exceeded the predetermined threshold.

2. The network according to claim 1, wherein the application software is downloaded from an application source to the device.

3. The network according to claim 1, wherein the central server compiles potentially damaging motion data in a database.

4. The network according to claim 3, wherein the central server sends a notification that potentially damaging motion has occurred.

5. The network according to claim 4, wherein the device checks communication availability with the central server.

6. The network according to claim 1, wherein the potentially damaging motion is a crash.

7. The network according to claim 1, further including a clock operatively connected to the device processor.

8. The network according to claim 7, further including an orientation sensor operatively connected to the device processor.

9. The network according to claim 7, wherein the potentially damaging motion relates to freefall.

10. The network according to claim 9, wherein the potentially damaging motion relates to freefall for more than 0.1 second.

11. The network according to claim 8, wherein the potentially damaging motion relates to impacts along an axis predetermined by the application software.

12. The network according to claim 1, wherein the central server processes the accelerometer motion information to ascertain motion frequency.

13. The network according to claim 1, wherein the central server processes the accelerometer motion information to ascertain motion direction.

14. The network according to claim 1, wherein the central server processes the accelerometer motion information to ascertain motion rapidity.

15. The network according to claim 1, wherein the central server processes the accelerometer motion information to predict likely damage.

16. The network according to claim 1, wherein the device further sends a response request to the central server.

17. A device for detecting whether its motion exceeds a potentially damaging threshold, comprising:
   a device having a device processor operating in accord with application software, a device data port, and an accelerometer operatively connected to the device processor;
   wherein the application software causes the device processor to obtain accelerometer motion information from the accelerometer;
   wherein the device processor determines if the accelerometer motion information exceeds a threshold for determining whether potentially damaging motion may have occurred and determines at least one application active and co-running with the application software at an instance when the motion information exceeds the threshold; and
   wherein the device transmits the accelerometer motion information from the device data port when the motion information exceeds the threshold and transmits an indication of at least one application which was active and co-running with the application software at the instance when the motion information exceeded the threshold.

18. The device according to claim 17, wherein the application software is downloaded from an application source to the device.

19. The device according to claim 17, wherein the accelerometer motion information relates to a crash.

20. The device according to claim 17, wherein the accelerometer motion information relates to freefall.

21. A computer-implemented monitoring and reporting method comprising the steps of:
   providing a portable device comprising an accelerometer motion detection apparatus;
   detecting with the accelerometer motion detection apparatus accelerometer motion information of the portable device;
   determining if the accelerometer motion information exceeds a predetermined threshold;
   determining an orientation of the portable device at an instance when the accelerometer motion information exceeds the predetermined threshold;
   providing a server system in communication with the portable device via a network;
   sending accelerometer motion information to the server system over the network;

providing an indication to a user that the accelerometer motion information exceeded the predetermined threshold;
predicting based on the determined orientation and the detected accelerometer motion information sent to the server system at least one portion of the mobile device subject to increased structural loading; and
providing an indication of the increased structural loading to the user.

22. The computer-implemented method of claim 21, further comprising providing to the user an indication of structural protection required to prevent damage to the mobile device resulting from the increased structural loading.

23. The computer-implemented method of claim 22, wherein providing to the user the indication of structural protection includes providing to the user a recommendation of a protective case.

24. The computer-implemented method of claim 22, wherein providing to the user the indication of structural protection includes providing the user a link to a network location corresponding to a commercial offering of the structural protection.

25. The computer-implemented method of claim 21, further comprising:
determining at least one application active at an instance when the accelerometer motion information exceeds the predetermined threshold; and
providing an indication to the user of the at least one application which was active at the instance when the accelerometer motion information exceeded the predetermined threshold.

26. A computer-implemented monitoring and reporting method comprising the steps of:
providing a portable device comprising a accelerometer motion detection apparatus;
detecting with the accelerometer motion detection apparatus acceleration motion information of the portable device;
determining if the acceleration motion information exceeds a particular threshold;
determining an orientation of the portable device at an instance when the acceleration motion information exceeds the particular threshold;
providing an indication to a user that the motion information exceeded the particular threshold;
predicting based on the determined orientation and the detected acceleration motion information at least one portion of the mobile device subject to increased structural loading; and
providing an indication of the increased structural loading to the user.

27. The computer-implemented method of claim 21, further comprising providing to the user an indication of structural protection required to prevent damage to the mobile device resulting from the increased structural loading based on the determined orientation and the detected acceleration motion information.

28. A computer-implemented monitoring and reporting method comprising the steps of:
providing a device having a device processor operating in accord with application software and an accelerometer operatively connected to the device processor;
obtaining by the processor via the application software acceleration motion information from the accelerometer;
determining by the processor w en the acceleration motion information exceeds a particular threshold;
determining by the processor at least one application active and co-miming with the application software at an instance when the accelerometer motion information exceeds the predetermined threshold; and
providing an indication to the user of the at least one application which was active and co-running with the application software at the instance when the accelerometer motion information exceeded the predetermined threshold.

* * * * *

UNITED STATES PATENT AND TRADEMARK OFFICE
CERTIFICATE OF CORRECTION

PATENT NO. : 9,300,776 B2
APPLICATION NO. : 13/304993
DATED : March 29, 2016
INVENTOR(S) : Heidi Petersen Page 1 of 1

It is certified that error appears in the above-identified patent and that said Letters Patent is hereby corrected as shown below:

IN THE CLAIMS

In claim 28, at column 12, line 27, delete "w en" and insert therefore --when--.

In claim 28, at column 12, line 30, delete "co-miming" and insert therefore --co-running--.

Signed and Sealed this
Seventh Day of June, 2016

Michelle K. Lee
*Director of the United States Patent and Trademark Office*